US010927890B2

(12) United States Patent
Kracke et al.

(10) Patent No.: US 10,927,890 B2
(45) Date of Patent: Feb. 23, 2021

(54) PRELOADED BEARING ARRANGEMENT

(71) Applicant: Goodrich Actuation Systems Limited, Wolverhampton (GB)

(72) Inventors: Jeremy Kracke, Sone (GB); Mark Timms, Wolverhampton (GB)

(73) Assignee: GOODRICH ACTUATION SYSTEMS LIMITED, Wolverhampton (GB)

( * ) Notice: Subject to any disclaimer, the term of this patent is extended or adjusted under 35 U.S.C. 154(b) by 0 days.

(21) Appl. No.: 16/657,667

(22) Filed: Oct. 18, 2019

(65) Prior Publication Data
US 2020/0200214 A1 Jun. 25, 2020

(30) Foreign Application Priority Data

Dec. 20, 2018 (EP) ..................................... 18275190

(51) Int. Cl.
*F16C 25/08* (2006.01)
*F16C 19/18* (2006.01)
*F16C 43/04* (2006.01)

(52) U.S. Cl.
CPC ............. *F16C 25/08* (2013.01); *F16C 19/18* (2013.01); *F16C 43/04* (2013.01)

(58) Field of Classification Search
CPC ...... F16C 19/18; F16C 19/181; F16C 19/182; F16C 19/183; F16C 19/184; F16C 25/083
See application file for complete search history.

(56) References Cited

U.S. PATENT DOCUMENTS

| 3,716,244 | A |   | 2/1973  | Hellwig |
|-----------|---|---|---------|---------|
| 4,173,376 | A | * | 11/1979 | Standing ............... F16C 25/083 384/517 |
| 7,575,090 | B2 | * | 8/2009  | Shiina .................. B62D 5/0409 180/443 |
| 9,567,871 | B2 |   | 2/2017  | Tully, Jr. et al. |
| 2002/0148315 | A1 | * | 10/2002 | Mittendorf ............... F16H 1/16 74/425 |

(Continued)

FOREIGN PATENT DOCUMENTS

| CH | 336653 A | 2/1959 |
| DE | 102008047269 A1 | 4/2010 |
| DE | 102016214814 A1 | 2/2018 |

OTHER PUBLICATIONS

Extended European Search Report for International Application No. 18275190.9 dated Jun. 26, 2019, 5 pages.

*Primary Examiner* — Phillip A Johnson
(74) *Attorney, Agent, or Firm* — Cantor Colburn LLP

(57) ABSTRACT

A method of making a preloaded bearing arrangement and a preloaded bearing arrangement are provided. The method comprises the steps of placing a bearing around a shaft and then placing a frustoconical disc spring around the shaft such that a portion of the disc spring abuts the bearing. A deformable cup is placed around the shaft, and an annular section of the deformable cup is spaced apart from the frustoconical disc spring and the cup is held at a fixed position along the shaft. A split shim is inserted between the annular section of the deformable cup and the disc spring to apply a preload to the disc spring. The deformable cup is then deformed such that a sidewall of the deformable cup extends around the split shim to hold the split shim in place relative to the shaft.

9 Claims, 7 Drawing Sheets

(56) References Cited

U.S. PATENT DOCUMENTS

2004/0210365 A1\* 10/2004 Tanaka ..................... F16F 1/32
                                                        701/41
2012/0294562 A1\* 11/2012 Brown .................. F16C 19/364
                                                        384/490

\* cited by examiner

PRELOADED BEARING ARRANGEMENT

FOREIGN PRIORITY

This application claims priority to European Patent Application No. 18275190.9 filed Dec. 20, 2018, the entire contents of which is incorporated herein by reference.

The present disclosure relates to preloaded bearing arrangements and a method of making a preloaded bearing arrangement.

BACKGROUND

In the field of engineering, a rotatable shaft is often provided that is intended to extend through a wall when in use. For example, a gearbox arrangement will generally comprise an input shaft (e.g. driven by a motor) extending through a wall of a gearbox housing to mesh with gears inside the gearbox. A bearing is therefore disposed between the wall and the rotatable shaft to allow the shaft to rotate freely relative to the wall. An output shaft that meshes with the gears may also extend out through a wall of the gearbox housing. A shim may be used to set the position of the shaft relative to the wall, e.g. by providing a fixed spacing between the bearings and one side of the wall.

It is known to provide a preload to the bearing(s) holding the shaft to ensure optimal functioning of the bearing(s). Typically this preload is achieved using a thread and nut, or a crown of smaller bolts. The axial stiffness of the bolt/joint system is, however, very high. Torque and clamp loss is a significant risk as very small bolt/nut rotation will release the clamp.

Bolt/nut locking features are in themselves subject to reliability concerns and are subject to human factors (e.g. minor over/under tightening of the bolt causes large variations in the preload), hence quality concerns. When shocks occur, the spring absorbs some of the shock and protects the mounting between the shaft and the wall. It is therefore desirable to improve the manufacturability of a preloaded bearing arrangement, both to simplify manufacture and to control the level of preload in a simple, accurate, and repeatable manner.

SUMMARY

According to a first aspect, the present disclosure provides a method of making a preloaded bearing arrangement, the method comprising the steps of placing a bearing around a shaft having an axis; placing a frustoconical disc spring around the shaft such that a portion of the disc spring abuts the bearing; placing a deformable cup around the shaft, wherein an annular section of the deformable cup is spaced apart from the frustoconical disc spring and is held at a fixed position along the axis of the shaft; inserting a split shim between the annular section of the deformable cup and the disc spring to apply a preload to the disc spring; and deforming the deformable cup such that a sidewall of the deformable cup extends around the split shim to hold the split shim in place relative to the shaft.

This allows accurate setting of the preload of the disc spring by sizing of the split shim Once the split shim is secured in place, the preload is set and will not change and will not change during use.

In the step of inserting a split shim, if the preload of the disc spring is determined to be too high, the method may further comprise removing the split shim; grinding down the split shim; and reinserting the ground split shim between the deformable cup and the disc spring, before the step of deforming the deformable cup.

Before the step of deforming the deformable cup, the deformable cup may comprise the annular section having an aperture, and a frustoconical section radially outwardly from the annular section, and the sidewall extending from the frustoconical section.

The step of deforming the deformable cup may comprise pressing on the sidewall and/or the frustoconical section to deform the frustoconical section into a generally annular shape.

The annular section of the deformable cup may be held at a fixed position along the axis of the shaft by a sleeve and a retaining ring.

The method may comprise: placing the preloaded bearing arrangement comprising the bearing, the rod, the disc spring, the split shim, and the deformable cup into an aperture of a wall such that an end section of the shaft extends through the wall and, securing the preloaded bearing arrangement to the wall with a mounting portion, wherein a portion of the shaft extends through the mounting portion.

According to a second aspect, the present disclosure provides a preloaded bearing arrangement comprising: a shaft having an axis; a bearing positioned circumferentially around the shaft; a frustoconical disc spring having a first surface and a second surface and being positioned circumferentially around the shaft, wherein a first surface of the disc spring abuts the bearing; a split shim positioned circumferentially around the shaft and in abutment with said second surface of the disc spring; and a deformable cup positioned circumferentially around the shaft and having a sidewall extending around the split shim; wherein an annular portion of the deformable cup is at an axially fixed position along the shaft; and wherein the disc spring has a preload.

The preloaded bearing arrangement may further comprise a sleeve and a retaining ring, wherein the annular portion of the deformable cup is fixed in position relative to the rod by the sleeve and a retaining ring.

The deformable cup may be made from a deformable material such that, during construction of the preloaded bearing arrangement, the deformable cup may be plastically deformed from a shape in which the sidewall does not extend around the split shim to a shape in which the sidewall extends around the split shim; preferably wherein the deformable material is steel; further preferably wherein the deformable material is S130 steel.

According to another aspect, there is provided a gearbox comprising a housing having a wall and wherein the shaft of the preloaded bearing arrangement extends through the wall; a first end of the shaft is configured to receive a first rod, the first rod being provided with teeth at one end and wherein the toothed end of the first rod is configured to mesh with a toothed component located within the housing of the gearbox. A second rod may also be received within the second end of the shaft, which is opposite the first end, may be configured to receive/connect to a second rod. In some examples, the second rod may be a driveshaft.

According to another aspect, there is provided a kit of parts for making the preloaded bearing arrangement of the second aspect, the kit comprising: a shaft; a bearing; a frustoconical disc spring; a split shim; a deformable cup; wherein the deformable cup comprises an annular portion, a frustoconical portion radially outward from the annular portion, and a sidewall extending from the frustoconical portion.

DESCRIPTION OF THE FIGURES

Certain embodiments of the present disclosure will now be described in greater detail by way of example only and with reference to the accompanying drawings in which:

FIG. 2A shows a rod extending through a bearing with a disc spring and a deformable cup;

FIG. 2B shows the arrangement of FIG. 2A with the addition of a sleeve and retaining ring;

FIG. 2C shows the arrangement of FIG. 2B in which the sleeve and deformable cup have been moved apart from the disc spring;

FIG. 2D shows the arrangement of FIG. 2C in which a split shim is inserted into the gap between the deformable cup and the disc spring;

FIG. 2E shows the deformable cup being deformed to extend around the split shim; and FIG. 2F shows the completed preloaded bearing arrangement.

DETAILED DESCRIPTION

Figure 1:
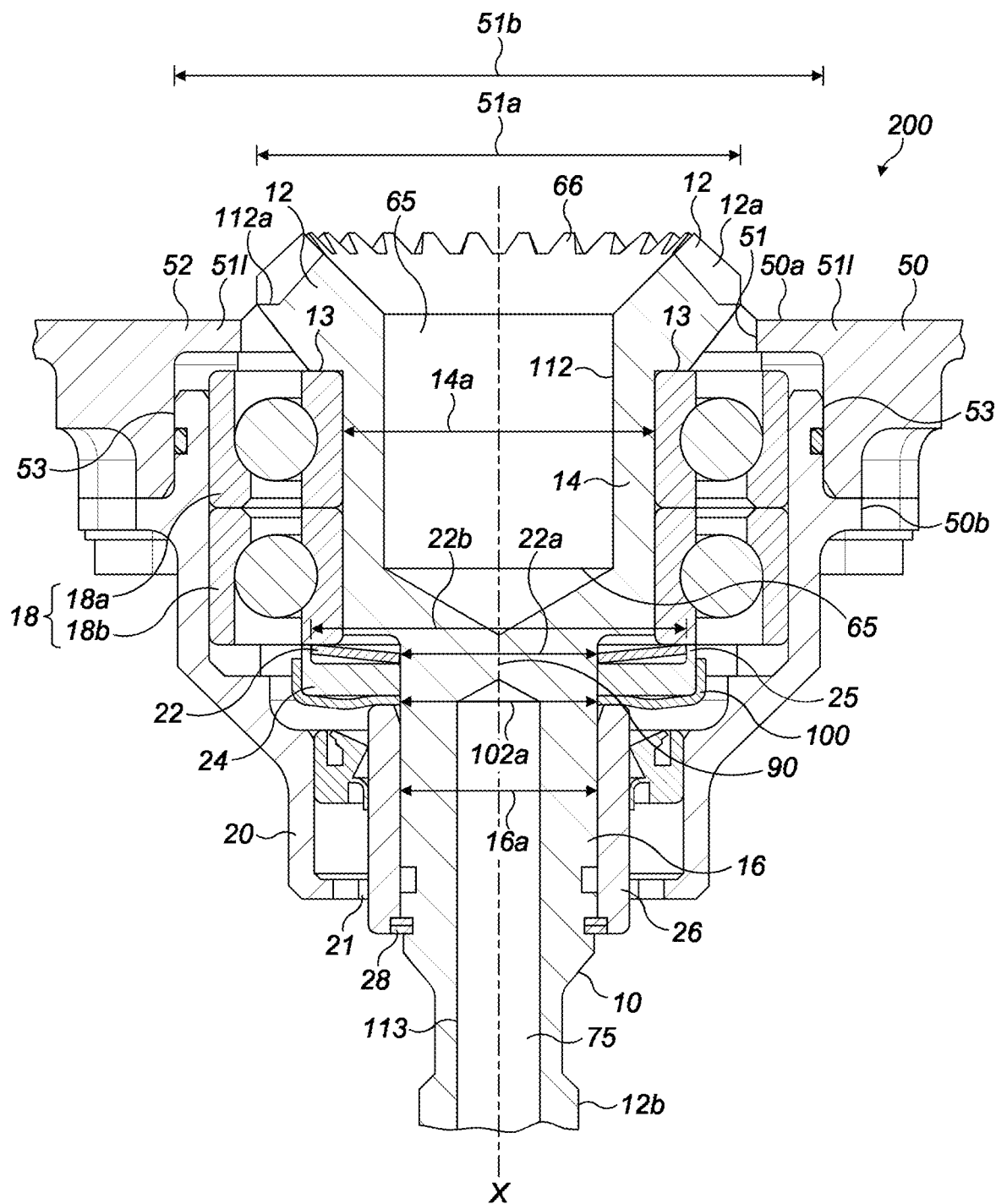
FIG. 1 shows a side view of a preloaded bearing arrangement in a wall.

FIG. 1 shows a new type of preloaded bearing arrangement 200 as described herein that comprises a single shaft 10 configured to receive a first rod 65 at one end and a second rod 75 at the opposite end, wherein the shaft 10 may be sized and shaped so as to be held within and extending through an aperture 51 of a wall 50. By way of example only, the wall 50 may be part of a housing of a gearbox and the shaft 10 may be a rotatable shaft extending into the gearbox.

As shown in FIG. 1, in some examples, the wall 50 through which the shaft 10 is to extend may be shaped and sized so as to correspond to and compliment the external contours of the shaft 10 as described below. In the example shown in FIG. 1, the aperture 51 extends through the wall from a first side 50a to a second side 50b and may be shaped and sized so as to have a first section 52 having a first internal diameter 51a. Adjacent the first section, the aperture 51 increases in diameter to provide a second section 53 that has a larger diameter 51b. This change in diameter may be an abrupt step so that the first section 52 in effect forms an inner circumferential collar 511 that extends circumferentially around the inner surface of the aperture 51 and which protrudes inwards. In other examples, the step may not be so abrupt. Thus, this change in internal diameter of the aperture forms an internally extending collar 52 having a central hole with the first diameter 51a.

The shaft 10 extends longitudinally along an axis X between a first end 12a and a second end 12b. The shaft 10 comprises a first internal hollow section 112 extending longitudinally within the shaft and inwardly from the first end 12a and a second longitudinally extending hollow section 113 extending within the shaft 10 inwardly from the second end 12b. In the example shown in FIG. 1, an intervening wall 90 is provided between the two hollow sections 112, 113 so that they are not connected to each other.

The hollow section 112 at the first end of the shaft may be configured to receive a first rod 65 which may be inserted therein in use. In some examples, wherein the wall 50 is that of a gearbox, the first rod 65 is positioned internally of the gearbox and the section of the first rod 65 that protrudes from the hollow section 112 may comprise gear teeth 66 at one end, e.g. for engaging with other toothed parts located on one side the wall 50, such as gears in a gearbox.

A second rod 75 may be inserted into the hollow section 113 at the opposite, second end 12b of the shaft. In use, this second rod 75 may be provided externally of the gearbox and may be connected to a motor for rotating the second rod 75. This rotation of the second rod 75 therefore results also in a rotation of the first rod 65 within the gearbox.

As shown in FIG. 1, the first end 12a of the shaft 10 (i.e. the end that would be positioned internally of the gear box in use) has as first section 12 that is shaped so as to have an outer diameter that matches the internal diameter 51a of the corresponding section of the wall within which it is positioned. Both the inner and outer diameter of this first section 12 of the shaft 10 decrease in the direction of the second end 12b of the shaft as shown in FIG. 1. That is, the first end of the shaft has a frustoconical shape, decreasing in diameter as it extends away from the first end 12a.

A second section 14 of the shaft 10 that is adjacent to this first section 12 is cylindrical and has a uniform outer diameter 14a. The junction between the first and second sections 12, 14 may be shaped so as to provide an abrupt increase in diameter between the cylindrically shaped second section 14 and the frustoconically shaped first section 12. This creates a ledge 13 of greater diameter than the diameter 14a.

Adjacent the second section 14, the shaft 10 has a third section 16 (extending in the direction of the second end 12b) that is also cylindrical but has a smaller outer diameter 16a than the diameter 14a of the second section 14.

The second rod 75 is positioned with the hollow section 113 of this third section 16.

In summary, the shaft 10 comprises a frustoconically shaped first section 12 that has a hollow interior 112 for receiving a first rod 65. The frustoconically shaped first section 12 has an outer diameter 51b that reduces in the direction of the second end 12b of the shaft 10. This first section 12 extends to an adjacent second, cylindrically shaped section 14 that has a uniform diameter 14a that is smaller than the diameter 51a. The second section 14 extends to and is connected to an adjacent third section 16 having an outer diameter 16a that is smaller than the second diameter 14a. The second rod 75 is configured to be received in the hollow interior 113 of this third section 16 of the shaft 10.

Two bearings 18a, 18b (collectively "bearings 18") are also held within the aperture 51 and positioned externally to the cylindrically shaped second section 14 of the shaft 10. The bearings 18 allow the shaft 10 to rotate relative to the wall 50. The inner race of one of the bearings 18a abuts the ledge 13 of the first section 12 such that the bearing 18a cannot move axially along the shaft 10 past the first section 12.

The outer race of the bearings has a greater diameter than the first diameter 51a of the aperture 51 in the wall 50 such that, in use, the outer race of the bearings 18 are held in place on one side by abutment with the collar 52. The inner races of the bearings 18 abut the second section 14 of the shaft 10. In an alternative example, not shown, a shim is provided between the wall and the outer race of the bearings 18.

In some examples, a mounting means 20 may be secured to the outer (second) side 50b of the wall 50 (e.g. via screws or other fasteners) and a part of the mounting means 20 may abut the outer race of at least one of the bearings 18 such that the bearings 18 are held between the internal circumferential collar 52 and the mounting portion 20. In an alternative example, not shown, only a single bearing is provided. For example, a suitable single bearing may comprise two tracks within common inner and outer races. Alternatively, individual single track 'gothic arch' or 'X' type bearings may be used.

The mounting means 20 has an aperture 21 and the third section 16 of the shaft 10 extends through the aperture 21.

As described in more detail below, a disc spring 22 having a preload is used to bias the shaft 10 to a predetermined position relative to the bearings 18. When the two bearings 18 are axially preloaded correctly then, during use, radial play of the shaft 10 within the aperture 51 is eliminated and the bearings 18 form the most stable arrangement.

The disc spring 22 has a generally frustoconical annular shape having an inner diameter 22a and an outer diameter 22b. The inner diameter 22a is sized to allow the disc spring 22 to fit around the third section 16 of the shaft 10. In use, this section of the disc spring is in contact with the outer surface of the third section 16 of the shaft 10. That is, the inner diameter 22a of the disc spring is slightly larger than the third diameter 16a. The disc spring 22 has a frustoconical shape and, in use, is oriented such that the section having the larger second diameter 22b is closer to the first end 12a of the shaft than section having the smaller diameter 12.

At the section of the disc spring having the largest diameter 22b, a first side of the disc spring 22 abuts an inner race of one of the bearings 18b. At the section of the disc spring having the smaller diameter 22a, a second, opposite side of the disc spring 22 abuts a split shim 24. That is, the split shim 24 is generally disposed on the opposite side of the disc spring 22 from the bearings 18, with the disc spring positioned therebetween. The split shim 24 may be formed from two or more pieces that together form a hollow cylindrical shape around the third section 16 of the shaft 10, as best shown in FIG. 2C. An annular rim 25 of the split shim 24 extends past the outer diameter 22b of the disc spring 22 towards the bearings 18.

As shown in FIGS. 1 and 2A to 2F, on the opposite side of the split shim 24 from the disc spring 22, there is provided a deformable cup 100 that, in use, holds the pieces of the split shim 24 together and holds the split shim 24 as a whole in place. The deformable cup 100 is deformed during construction of the present arrangement, as described in more detail below. The deformable cup 100 has an aperture 102 having a diameter 102a in its base that allows the third section 16 of the shaft 10 to extend through the deformable cup 100. After construction, walls 108 of the deformable cup substantially enclose the split shim 24 so as to hold the split shim 24 in place relative to the shaft 10.

On the opposite side of the deformable cup 100 from the split shim 24, there is a sleeve 26 that is fixed to the shaft 10 by a retaining ring 28 around the third section 16 such that the sleeve 26 cannot move axially along the shaft 10. The sleeve 26 holds the deformable cup 100 in place. The deformable cup 100, in turn, holds the split shim 24 in place, and the split shim 24 holds the disc spring 22 in place against the bearing 18b. The sleeve 26 extends through the aperture 21 in the mounting portion 20.

FIGS. 2A-2F show the stages of constructing the arrangement 200 that has been described above. The wall 50 and mounting portion 30 have both been omitted for clarity in these Figures.

Figure 2A:
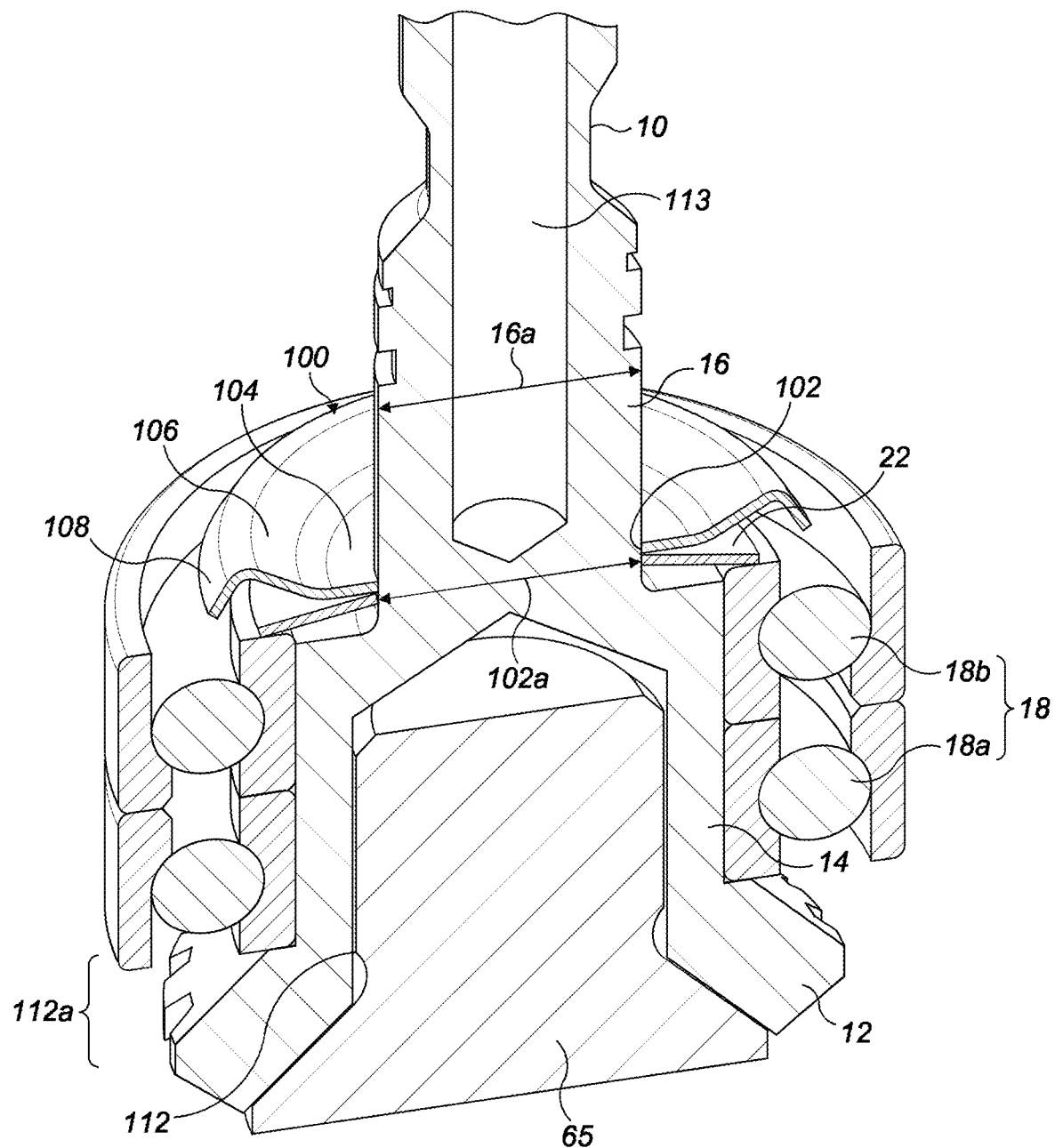
FIGS. 2A-2F show a sequence of steps in the construction of a preloaded bearing arrangement; specifically.

In FIG. 2A, the shaft 10 has been placed inside the bearings 18 such that the bearings 18 abut the second section 14 of the shaft 10 (i.e. they abut the section of the shaft having a uniform cylindrical shape. The disc spring 22 has been placed on the third section 16 of the shaft 10 with a portion of the disc spring 22 near its outer (larger) diameter 22b abutting the inner race of one of the bearings 18b. The deformable cup 100 has been placed on the third section 16 of the shaft 10 in its pre-deformed shape.

The deformable cup 100 comprises an inner annular section 104 that forms the aperture 102 through which the third section 16 of the shaft 10 extends. The aperture 102 of the deformable cup has a diameter 102a that is slightly larger than the diameter 16a of the third section 16 of the shaft 10.

Radially outward from the annular section 104, in its pre-deformed state, the deformable cup 100 has a frustoconical section 106 which flares outwards away from the bearings 18. That is, the larger diameter of the frustoconical portion 106 is further from the bearings 18 and disc spring 22 than the smaller diameter portion of the frustoconical portion 106. As described in more detail later, the frustoconical section 106 is deformed during construction to become a generally annular shape. Still considering the pre-deformed state of the deformable cup 100, radially outward from the frustoconical section 106, the deformable cup 100 has a generally annular sidewall 108 extending from the frustoconical section 106. As described in more detail later, the sidewall 108 eventually encloses the split shim 24 in the finished preloaded bearing arrangement 200. In the pre-deformed shape, as shown in FIG. 2A, the sidewall 108 is generally spaced apart from the bearings 18.

Figure 2B:
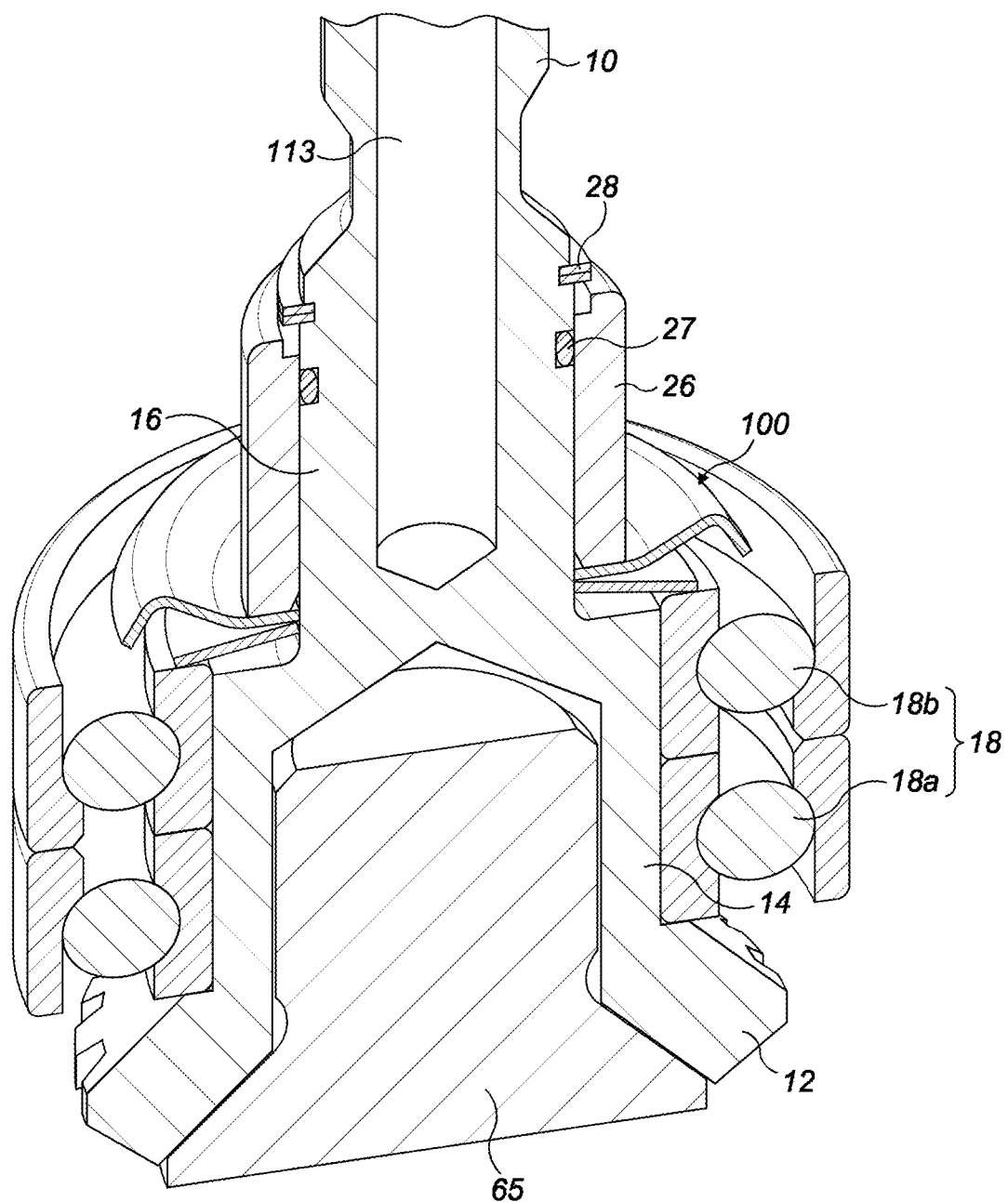
Figure 2C:
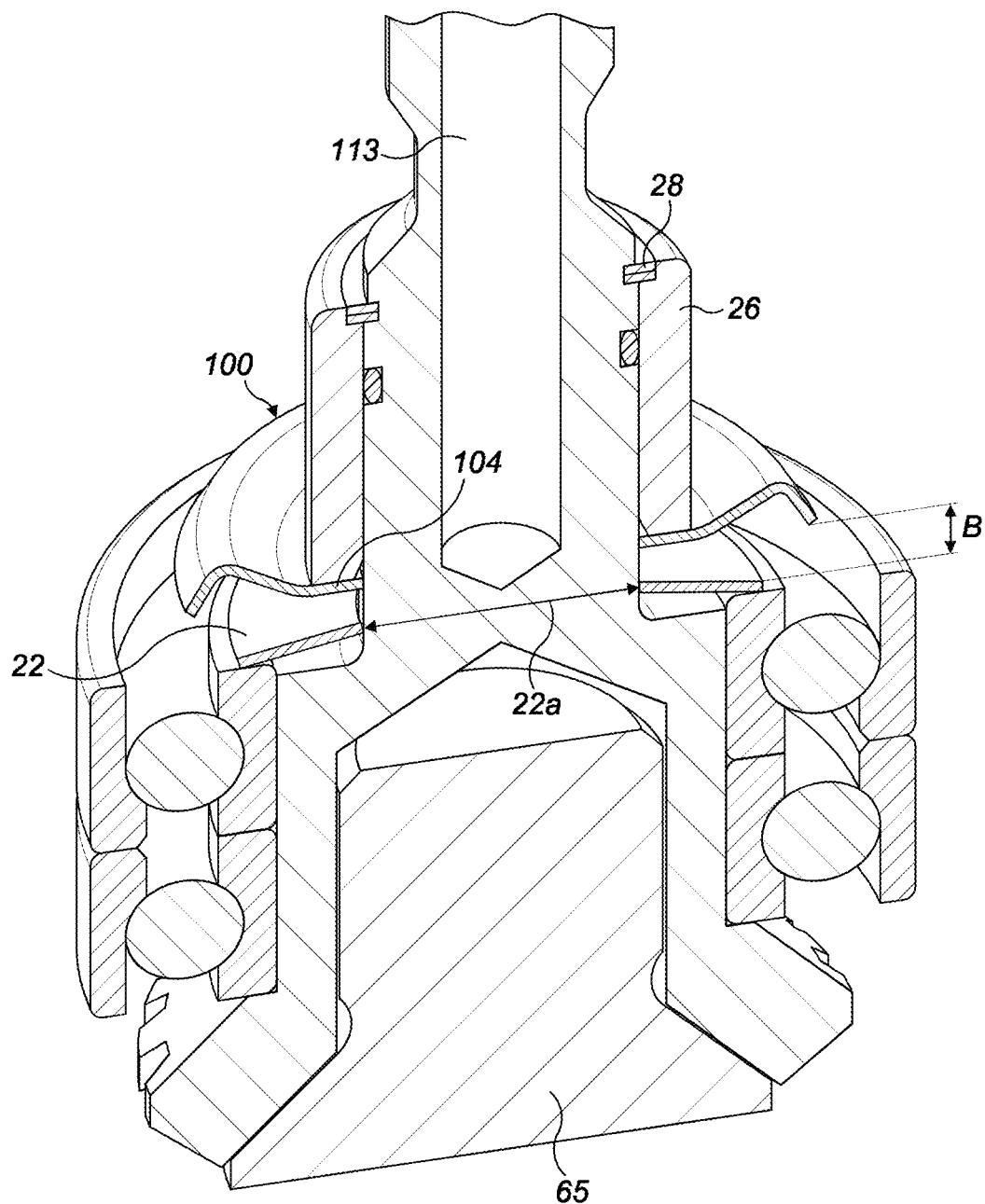
Figure 2D:
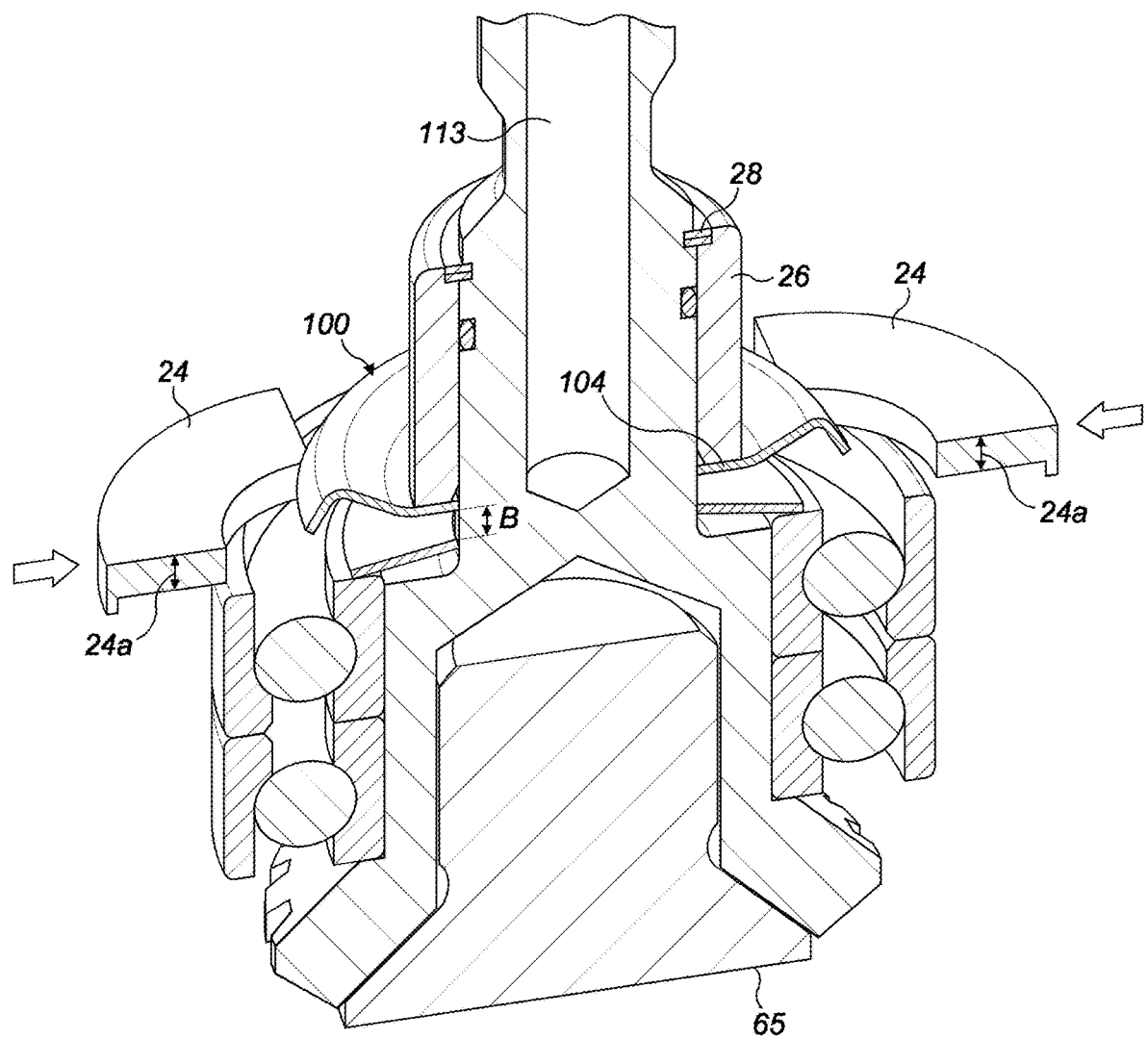

The next step of construction is shown in FIG. 2B. In this step, the sleeve 26 is slid onto the third section 16 of the shaft 10 until it abuts the annular section 104 of the deformable cup 100. The retaining ring 28 is then attached to the shaft 10 at a location on the opposite side of the sleeve 26 from the deformable cup 100. In this position depicted in FIG. 2B, the retaining ring 28 is spaced apart from an end of the sleeve 26, thus allowing the sleeve 26 to move axially along the shaft 10 between the retaining ring 28 at one end and the deformable cup 100 at the other end. An O-ring 27 may be provided in a groove on the shaft 10 to seal between the sleeve 26 and shaft 10.

The next step of construction is shown in FIG. 2C. In this step, the sleeve 26 and deformable cup 100 are both slid along the shaft 10 until the sleeve 26 abuts the retaining ring 28. In this position, the deformable cup 100 is spaced apart from the inner diameter 22a region of the disc spring 22 by a distance B. Due to its pre-deformed shape, the frustoconical section 106 and the sidewall 108 of the deformable cup 100 provide space for the split shim 24 to be inserted between the annular portion 104 of the deformable cup 100 and the disc spring 22.

In the finished arrangement 200, the disc spring 22 has a preload. The amount of preload may be determined during the next construction steps, as described below.

The split shim 24 is sized to have a thickness 24a at its inner diameter that is slightly greater than distance B. Distance B may be measured for each preloaded bearing assembly 200 constructed and the split shim 24 may be selected/modified appropriately. As such, when the split shim 24 is inserted (see FIG. 2D) between the annular portion 104 of the deformable cup 10 and the disc spring 22, the disc spring 22 is slightly compressed between an inner diameter region of the split shim 24 and the bearing 18b. This provides the preload. At this stage, if it is determined the preload is too high, the split shim 24 may be modified (e.g. ground down) to have a smaller thickness 24a than before so as to reduce the preload when it is inserted between the annular portion 104 of the deformable cup 10 and the disc spring 22.

Figure 2E:
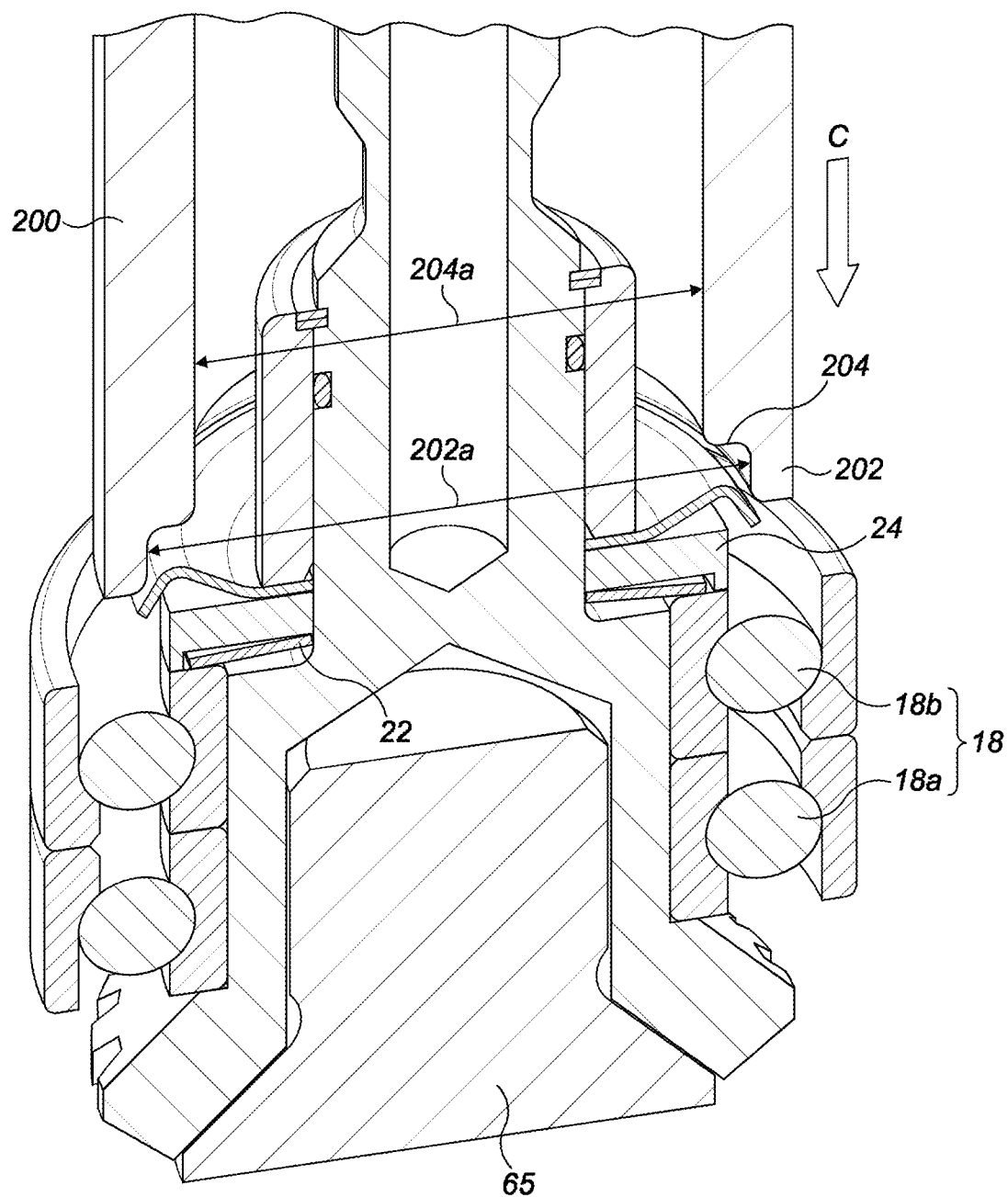
Figure 2F:
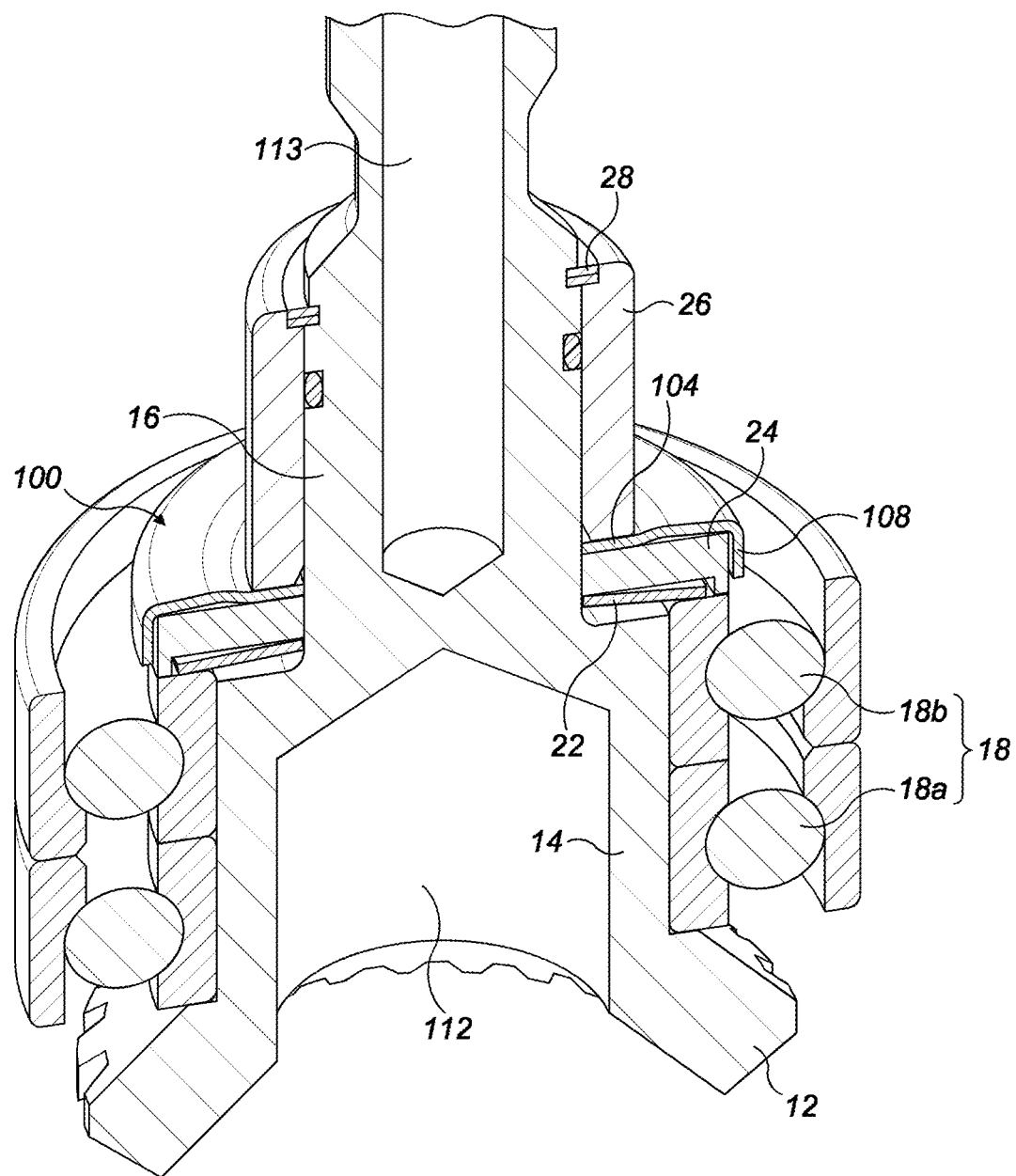

The next step of construction is shown in FIG. 2E. In this step, the deformable cup 100 is deformed so as to close the deformable cup 100 around the split shim 24. This deformation is accomplished by pressing a press tool in the form of a hollow cylinder 200, inserted over the shaft 10, onto the deformable cup 100 to press the deformable cup 100 into its deformed shape. At one end the cylinder 200 has a first section 202 having a first inner diameter 202a. Axially along the cylinder 25 from the end, there is a second section having a second, smaller, inner diameter 204a. The region having the second diameter 204a therefore forms a lip 204 on the inner surface of the cylinder 200.

When the cylinder 200 is used to deform the deformable cup 100, the first portion 202 of the cylinder 200 initially abuts the sidewall 108 of the deformable cup 100 and is pressed in a direction C that is along the axis X of the shaft 10. This action starts to deform the frustoconical section 106 of the deformable cup 100. After an initial amount of deformation, the lip 204 of the cylinder 200 comes into abutment with the deformable cup 100 at a region where the frustoconical portion 106 merges into the sidewall 108. With continued pressure from the cylinder 200 in direction C, along the axis X of the shaft 10, the frustoconical portion 106 is deformed into a generally annular shape and the sidewall 108 encloses the split shim 24. Thus, once deformed, the deformable cup 100 encloses the split shim 24 on one axial side and on its radially outer side, holding the split shim 24 in place. The cylinder 200 may then be removed. Once the cylinder 200 is removed after having deformed the deformable cup 100 (see FIG. 2F), the annular portion 104 of the deformable cup 100 is in the same axial position along the rod axis X as it was when the deformable cup 100 was in its pre-deformed shape. As such, no additional preload is applied to the disc spring 22 by the action of deforming the deformable cup 100. That is, the preload is set during the step of sizing the thickness of the split shim 24 and the preload is not altered by subsequent construction steps.

With the above method of construction, it is possible to later remove the deformable cup 100 (either non-destructively or destructively so, depending on the method chosen for removing or un-deforming the deformable cup 100) in order to adjust or replace the split shim 24 and thereby adjust the preload of the disc spring 22.

The change in shaft 10 diameter from the second section 14 to the third section 16 allows for the use of a more flared frustoconical shape of the disc spring 22. However, in an alternative example, not shown, the rod has a constant diameter along its length (excluding the end section 12 which may remain in the shape depicted in the Figures).

The deformable cup 100 may be made from any plastically deformable material. In one example, the deformable cup is made from steel, for example S130 steel.

The disc spring 22 may be made from any suitable resilient material. In one example, the disc spring 22 is made from steel, for example 51CrV4.

The split shim 24 may be made from any suitable material. In one example, the split shim 24 is made from steel, for example S80 steel.

The bearings 18 may be of any suitable type. For example, one of ball bearings, taper roller bearings, deep groove bearings, thrust bearings, or needle bearings.

What is claimed is:

1. A preloaded bearing arrangement comprising:
   a shaft having an axis (X);
   a bearing positioned circumferentially around the shaft;
   a frustoconical disc spring having a first side surface and an opposite, second side surface and being positioned circumferentially around the shaft, wherein a first surface of the disc spring abuts the bearing;
   a split shim positioned circumferentially around the shaft and in abutment with said second surface of the disc spring; and
   a deformable cup positioned circumferentially around the shaft and having a sidewall extending around the split shim;
   wherein an annular portion of the deformable cup is at an axially fixed position along the shaft; and
   wherein the disc spring has a preload.

2. The preloaded bearing arrangement of claim 1, further comprising a sleeve and a retaining ring, wherein the annular portion of the deformable cup is fixed in position relative to the rod by the sleeve and a retaining ring.

3. The preloaded bearing arrangement of claim 1, wherein the deformable cup is made from a deformable material such that, during construction of the preloaded bearing arrangement, the deformable cup may be plastically deformed from a shape in which the sidewall does not extend around the split shim to a shape in which the sidewall extends around the split shim.

4. The preloaded bearing arrangement of claim 3 wherein the deformable material is steel.

5. The preloaded bearing arrangement of claim 4 wherein the deformable material is S130 steel.

6. A gearbox comprising
   a housing having a wall; and
   the preloaded bearing arrangement of claim 1,
   wherein the shaft of the preloaded bearing arrangement extends through the wall;
   wherein a first end of the shaft is configured to receive a first rod that is provided with teeth at one end and wherein the first rod is configured to mesh with a toothed component located within the housing of the gearbox.

7. The gearbox of claim 6 wherein a second end of the shaft, opposite the first end, is configured to receive a second rod.

8. The gearbox of claim 7 wherein the second shaft is a driveshaft.

9. A kit of parts for making the preloaded bearing arrangement of claim 1, the kit comprising:
   the shaft;
   the bearing;
   the frustoconical disc spring;
   the split shim;
   the deformable cup;
   wherein the deformable cup comprises the annular portion, a frustoconical portion radially outward from the annular portion, and a sidewall extending from the frustoconical portion.

* * * * *